United States Patent
Li et al.

(10) Patent No.: US 11,287,906 B2
(45) Date of Patent: Mar. 29, 2022

(54) PASSIVE ELECTROMAGNETIC FOUNTAIN PEN

(71) Applicant: HANVON UGEE TECHNOLOGY CO., LTD., Shenzhen Guangdong (CN)

(72) Inventors: Yuanzhi Li, Shenzhen Guangdong (CN); Liming Deng, Shenzhen Guangdong (CN)

(73) Assignee: HANVON UGEE TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/277,890

(22) PCT Filed: Oct. 18, 2018

(86) PCT No.: PCT/CN2018/110837
§ 371 (c)(1),
(2) Date: Mar. 19, 2021

(87) PCT Pub. No.: WO2020/056834
PCT Pub. Date: Mar. 26, 2020

(65) Prior Publication Data
US 2021/0318765 A1     Oct. 14, 2021

(30) Foreign Application Priority Data

Sep. 19, 2018   (CN) .......................... 201811094901.6

(51) Int. Cl.
*G06F 3/0354*   (2013.01)
*H01F 27/24*    (2006.01)
*H01F 27/28*    (2006.01)

(52) U.S. Cl.
CPC ......... *G06F 3/03545* (2013.01); *H01F 27/24* (2013.01); *H01F 27/28* (2013.01)

(58) Field of Classification Search
CPC ... G06F 3/03545; G06F 3/0354; B43K 27/00; B43K 29/08; H01F 27/24; H01F 27/28
See application file for complete search history.

(56) References Cited

U.S. PATENT DOCUMENTS

| 5,565,632 A | 10/1996 | Ogawa |
| 2011/0084846 A1 | 4/2011 | Li et al. |

(Continued)

FOREIGN PATENT DOCUMENTS

| CN | 200939759 Y | 8/2007 |
| CN | 101901046 A | 12/2010 |

(Continued)

OTHER PUBLICATIONS

First Office Action, The State Intellectual Property Office of People's Republic of China, Application No. 201811094901.6, dated Apr. 29, 2019, 14 pages.

(Continued)

*Primary Examiner* — Temesghen Ghebretinsae
*Assistant Examiner* — Ivelisse Martinez Quiles
(74) *Attorney, Agent, or Firm* — Vorys, Sater, Seymour and Pease LLP

(57) ABSTRACT

Disclosed is a passive electromagnetic fountain pen, which includes a pen core and a pen body, wherein the pen body includes a first iron core and an iron core holder, a pen core clamp link, a second iron core, a third iron core, an elastic component, a pressure regulating plate, and a first structure matched with the pressure regulating plate are disposed sequentially from front to back in the iron core holder, coils are wound outside the first iron core and the second iron core, the first iron core is close to a pen tip of the pen core, the second iron core is fixedly connected with the iron core (Continued)

holder, the pen core is configured to pass through a center of the first iron core, and then be clamped by one end of the pen core clamp link.

16 Claims, 4 Drawing Sheets

(56) References Cited

U.S. PATENT DOCUMENTS

| | | | |
|---|---|---|---|
| 2014/0043300 A1 | 2/2014 | Lien | |
| 2014/0055425 A1* | 2/2014 | Li | G06F 3/046 345/179 |
| 2016/0018912 A1* | 1/2016 | Kaneda | G06F 3/033 345/179 |
| 2018/0039345 A1* | 2/2018 | Obata | G06F 3/03545 |

FOREIGN PATENT DOCUMENTS

| | | |
|---|---|---|
| CN | 103631399 A | 3/2014 |
| CN | 103677337 A | 3/2014 |
| CN | 204066032 U | 12/2014 |
| CN | 204270250 U | 4/2015 |
| CN | 204440332 U | 7/2015 |
| CN | 106354285 A | 1/2017 |
| CN | 206021215 U | 3/2017 |
| CN | 206209627 U | 5/2017 |
| CN | 107521259 A | 12/2017 |
| CN | 107924211 A | 4/2018 |
| CN | 208834271 U | 5/2019 |
| CN | 208834272 U | 5/2019 |
| CN | 209305180 U | 8/2019 |
| CN | 109032396 B | 3/2020 |
| DE | 2305002 A1 | 8/1973 |
| DE | 19602851 A1 | 7/1997 |
| EP | 1331547 A1 | 7/2003 |
| JP | H0496212 A | 3/1992 |
| JP | H08227336 A | 9/1996 |
| TW | M445213 U | 1/2013 |

OTHER PUBLICATIONS

International Search Report, State Intellectual Property Office of the P.R. China, PCT/CN2018/110837, dated Jun. 6, 2019, 4 pages.
Notification to Grant Patent Right for Invention, The State Intellectual Property Office of People's Republic of China, Application No. 201811094901.6, dated Mar. 3, 2021, 3 pages.
The Second Office Action, The State Intellectual Property Office of People's Republic of China, Application No. 201811094901.6, dated Jan. 10, 2020, 17 pages.
The Third Office Action, The State Intellectual Property Office of People's Republic of China, Application No. 201811094901.6, dated Sep. 16, 2020, 10 pages.
Written Opinion of the International Search Authority, PCT/CN2018/110837, 5 pages.

* cited by examiner

621

PASSIVE ELECTROMAGNETIC FOUNTAIN PEN

CROSS-REFERENCE TO RELATED APPLICATIONS

This application is a national stage filing under 35 U.S.C. § 371 of international application number PCT/CN2018/110837, filed Oct. 18, 2018, which claims priority to Chinese patent application No. 201811094901.6, filed Sep. 19, 2018. The contents of these applications are incorporated herein by reference in their entirety.

TECHNICAL FIELD

The present disclosure relates to the field of information input devices, and more particularly, to a passive electromagnetic fountain pen.

BACKGROUND

With the continuous development of digital electronic information technology, human-computer interaction is getting closer to life. Electromagnetic touch control is increasingly pursued by people because of being capable of perfectly presenting original handwriting input.

Main devices for electromagnetic touch control include an antenna board, a control board, and an electromagnetic pen. As a key component of the electromagnetic touch control, the electromagnetic pen can not only be operated by point control, but also use a pressure-sensitive characteristic thereof to paint and practice writing.

The electromagnetic pen transmits an electromagnetic wave based on an internal field closed circuit thereof and the antenna board on a device applying an electromagnetic touch control technology to position the electromagnetic pen. The field closed circuit of the electromagnetic pen is generally composed of an inductor and a capacitor, wherein the inductor is composed of an iron core and a coil, and a frequency of the electromagnetic pen may be changed by regulating an inductance or capacitance value.

Although an electromagnetic input technology has been widely used in a tablet, a mobile phone, an electronic paper book, a handwriting board, an electronic whiteboard, and other electronic devices, a common electromagnetic pen can only be operated on a corresponding electromagnetic device, and cannot be used for writing on paper. Therefore, an electromagnetic fountain pen with both electromagnetic writing and ink writing functions has appeared in the market.

Currently, the electromagnetic fountain pen is mostly implemented by a variable capacitance technology, but the variable capacitance technology is limited by an accuracy and a price of a variable capacitor, such that it is difficult to popularize the electromagnetic fountain pen in performance, price, and other aspects. In addition, the electromagnetic fountain pen is composed of many parts, each part has its own manufacturing error, and each part is made of different materials. Therefore, a problem of size inconsistency often occurs during assembly and production, which leads to a condition that an actual size of the electromagnetic pen in delivery is smaller than or larger than a standard size, thereby being not conducive to mass production.

SUMMARY

In order to solve the above technical problem, the present disclosure aims to provide a passive electromagnetic fountain pen with a low price and a good consistency.

The technical solution adopted in the present disclosure is as follows: a passive electromagnetic fountain pen includes a pen core and a pen body, the pen body includes a first iron core and an iron core holder; a pen core clamp link, a second iron core, a third iron core, an elastic component, a pressure regulating plate, and a first structure matched with the pressure regulating plate are disposed sequentially from front to back in the iron core holder, coils are wound outside the first iron core and the second iron core, the first iron core is close to a pen tip of the pen core, the second iron core is fixedly connected with the iron core holder, the pen core is configured to pass through a center of the first iron core, and then be clamped by one end of the pen core clamp link, and the other end of the pen core clamp link is configured to pass through a center of the second iron core, and then drive the third iron core to move; and the pressure regulating plate when in rotation is configured to be in surface contact with the first structure by a surface to generate an axial displacement to change an axial displacement of the elastic component.

Further, a step is disposed on the pen core clamp link.

Further, a contact surface between the pressure regulating plate and the first structure is a first inclined plane, and a contact surface between the first structure and the pressure regulating plate is a second inclined plane.

Further, the elastic component comprises a silicone rod and a spring sleeved outside the silicone rod, and the silicone rod is fixedly connected with the pressure regulating plate.

Further, a hole matched with the silicone rod is disposed in the pressure regulating plate.

Further, a rotary handle is disposed on the pressure regulating plate.

Further, an outer diameter of the second iron core is smaller than that of the third iron core.

Further, a first through hole is formed in the center of the second iron core, a second through hole is formed in a center of the third iron core, and a diameter of the first through hole is larger than that of the second through hole.

Further, a PCBA circuit board is disposed outside the iron core holder.

Further, the PCBA circuit board is connected with the iron core holder by a screw.

The present disclosure has the beneficial effects that the pen body includes the iron core holder and the first iron core with the wound coil, the iron core holder includes the pen core clamp link, the third iron core, and the second iron core with the wound coil, a distance between the second iron core and the third iron core is changed by movement of the pen core cooperated with the pen core clamp link so as to change inductance of the passive electromagnetic fountain pen, and then the frequency of the fountain pen is changed, and a variable inductance technology is used to replace a variable capacitance technology, such that a price is lower, and a performance is better; and the pressure regulating plate and the first structure matched with the pressure regulating plate are additionally provided, the pressure regulating plate in rotation is in surface contact with the first structure by the surface, such that the pressure regulating plate generates the axial displacement, so as to change the axial displacement of the elastic component, thereby enabling an actual size of the passive electromagnetic fountain pen in delivery to be equal to a standard size by changing the axial displacement of the elastic component, ensuring a consistent weight sense of each passive electromagnetic fountain pen, and being conducive to mass production.

DETAILED DESCRIPTION

Figure 1:
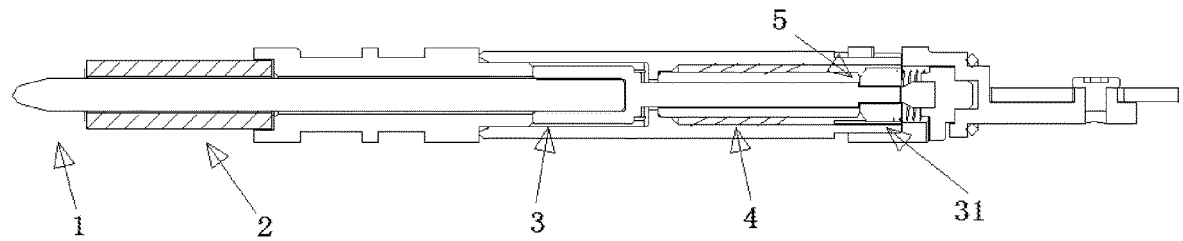
FIG. 1 is a schematic structural diagram of a passive electromagnetic fountain pen of the present disclosure.

The present disclosure is further explained hereinafter with reference to the accompanying drawings and the specific embodiments of the specification.

Referring to FIG. 1, FIG. 2, FIG. 3, and FIG. 4, a passive electromagnetic fountain pen of the present disclosure includes a pen core 1 and a pen body. The pen body includes a first iron core 1 and an iron core holder, a pen core clamp link 3, a second iron core 4, a third iron core 5, an elastic component, a pressure regulating plate 9, and a first structure 62 matched with the pressure regulating plate 9 are disposed sequentially from front to back in the iron core holder, coils are wound outside the first iron core 2 and the second iron core 4, the first iron core 2 is located at a pen tip of the pen core 1, the second iron core 4 is fixedly connected with the iron core holder, the pen core 1 passes through a center of the first iron core 2, and then is clamped by one end of the pen core clamp link 3, and the other end of the pen core clamp link 3 passes through a center of the second iron core 4, and then drives the third iron core 5 to move. The pressure regulating plate 9 when in rotation is in surface contact with the first structure 62 by a surface, such that the pressure regulating plate 9 generates an axial displacement, so as to change an axial displacement of the elastic component.

In the present disclosure, a three-iron-core structure is used to change inductance, wherein the first iron core 2, which is an iron core with a wound coil, is close to the pen tip of the pen core, and is responsible for receiving and transmitting energy. Moreover, the second iron core 4 is an iron core with a wound coil, and the third iron core 5 is an iron core without a wound coil. A through hole in the center of the second iron core 4 is larger than a through hole in a center of the third iron core 5. The two iron cores are disposed behind the pen core, and the second iron core 4 is closer to the pen tip of the pen core than the third iron core 5. This structure may provide an enough space behind the third iron core 5 to design an internal elastic component, such that the pen tip has an excellent force feedback performance.

Figure 3:
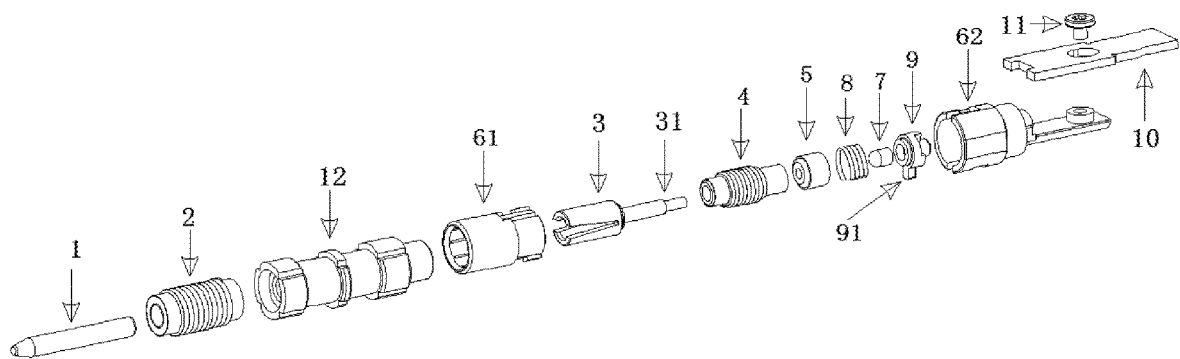
FIG. 3 is an exploded view of a structure of an embodiment of the passive electromagnetic fountain pen of the present disclosure.

The pen core clamp link 3 has pen core clamping and linking functions. As shown in FIG. 3, one end of the pen core clamp link 3 may clamp the pen core 1, and the other end of the pen core clamp link 3 has the linking function, and is an elongated plastic rod. The pen core clamp link 3 may be loaded from a direction of the pen tip of the iron core holder.

When the pen core is stressed, the pen core 1 passes through the center of the first iron core 2, and then is clamped by one end of the pen core clamp link 3, and the other end of the pen core clamp link 3 passes through the center of the second iron core 4, and then pushes the third iron core 5 to move, such that a distance between the second iron core 4 and the third iron core 5 is changed, resulting in a change of an inductance value.

Figure 5:
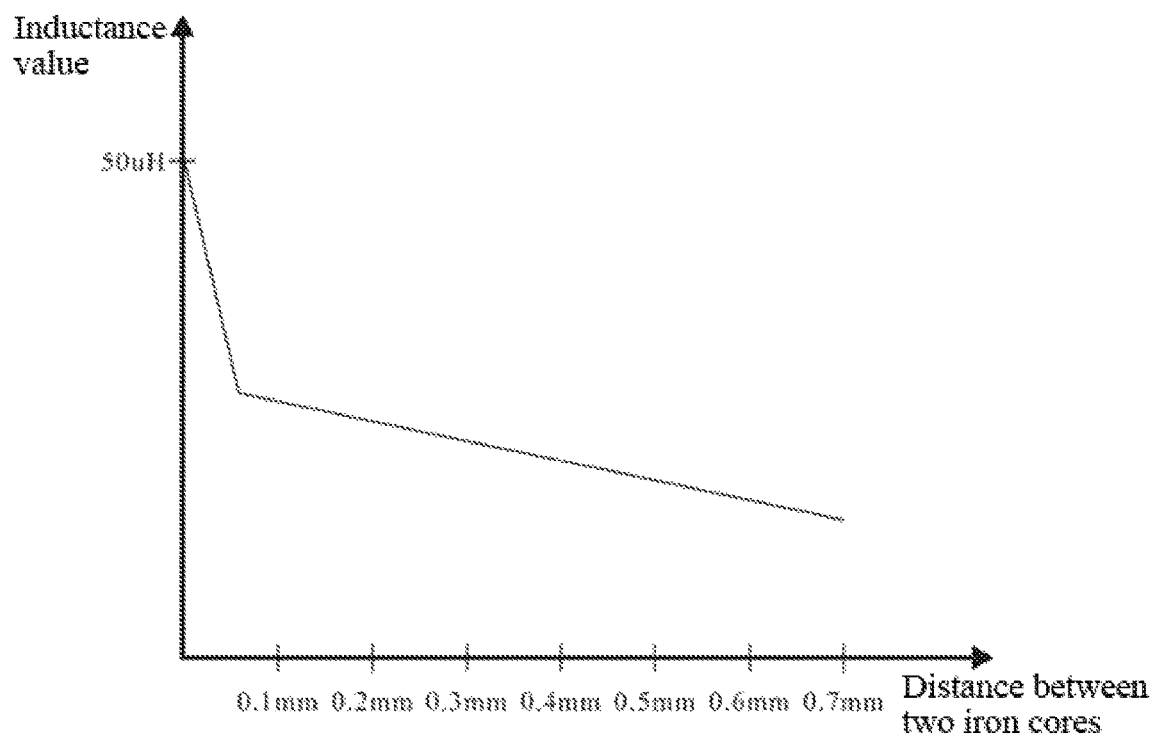
FIG. 5 is a curve graph showing a relationship between a distance between two iron cores and an inductance value of a coil.

As shown in FIG. 5, in the present disclosure, when the second iron core 4 and the third iron core 5 are tightly attached to each other, an air gap between the two iron cores is extremely small. When the iron cores are slightly pushed by the pen core, the air gap is generated between the two iron cores. At the moment, a magnetic resistance is added on a magnetic circuit (i.e., a magnetic field closed loop), and the inductance value can be greatly reduced. In the present disclosure, by utilizing the characteristic, when the pen core is moved slightly, a large enough change of a frequency of the pen can be generated. In a usage occasion of the fountain pen, an electronic handwriting is capable of appearing during painting lightly, with a same use feeling as a real fountain pen and a real pencil.

The PCBA circuit board has a fixed capacitance value, two coil-wound inductors of the first iron core 2 and the second iron core 4 are connected in parallel with a capacitor on the PCBA circuit board. An antenna board emits a frequency to charge the pen initially, when the antenna board stops emitting, the pen may be changed from receiving energy to emitting energy, and the coil-wound inductor on the pen is changed, and is connected in parallel with the fixed capacitor on the PCBA circuit board, which may change a frequency emitted by the pen, such that the antenna board is capable of obtaining different frequencies of the pen, and different changes of a pressure value of the pen are generated.

Figure 2:
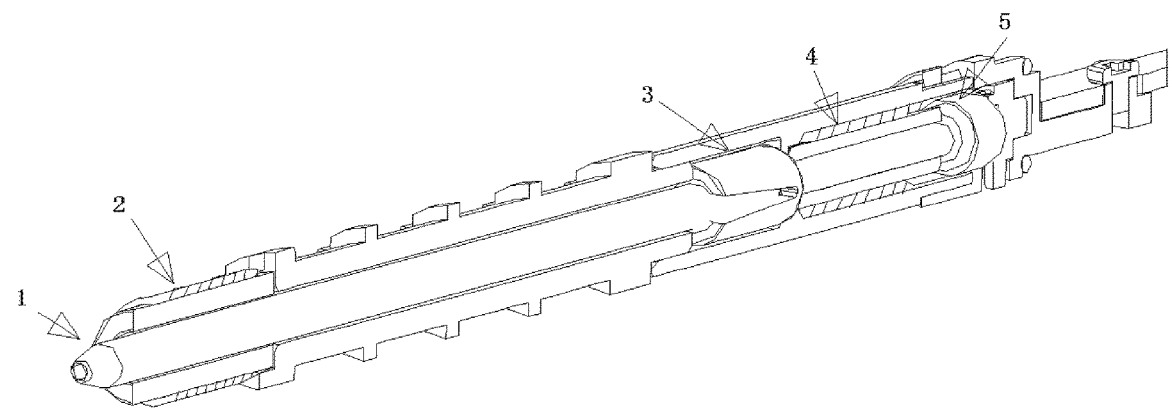
FIG. 2 is a sectional view of the passive electromagnetic fountain pen of the present disclosure.
Figure 4:
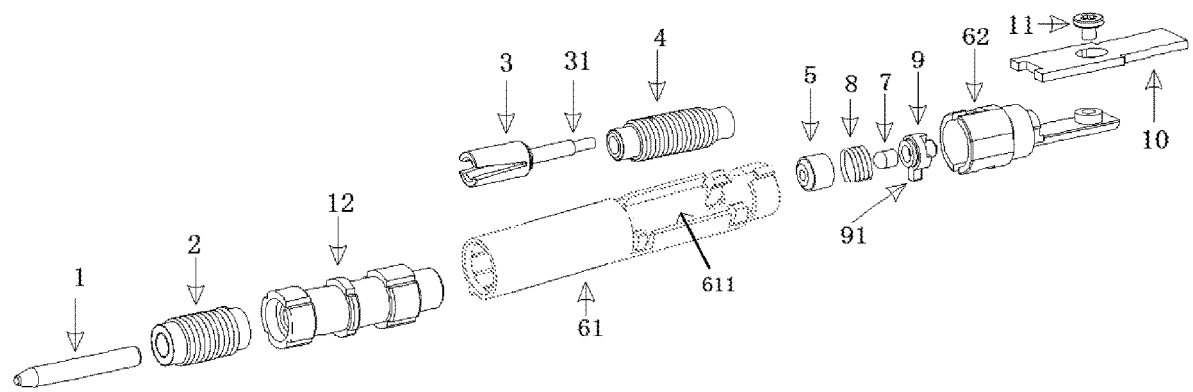
FIG. 4 is an exploded view of a structure of another embodiment of the passive electromagnetic fountain pen of the present disclosure.

As shown in FIG. 1 and FIG. 2, the first iron core 2, the second iron core 4, and the third iron core 5 of the present disclosure may all be a hollow structure. The pen tip of the pen core 1 is located on the left, and the tail end is located on the right. As shown in FIG. 3 or FIG. 4, the iron core holder includes an iron core front portion 61 and an iron core tail portion (i.e., the first structure) 62 which are matched with each other, and the iron core tail portion 62 may be combined with the iron core front portion 61 in a rotating manner during assembly to form the iron core holder. The second iron core 4 may be completely installed and fixed inside the iron core holder from a direction of the pen tail as shown in FIG. 3, or may be loaded in the iron core holder through a groove 611 on the iron core holder as shown in FIG. 4. Moreover, the third iron core 5 is located behind the second iron core 4, is installed inside the iron core holder, and may move in the iron core holder. The iron core clamp link 3 passes through the center of the second iron core 4, and then pushes the third iron core 5 to move in the iron core holder.

The axial displacement is generated by contact between the pressure regulating plate 9 in rotation and the first structure 62 in a way of a height change of an inclined plane (which is a contact surface between the pressure regulating plate and the first structure).

The elastic component is used for providing a reverse acting force to the pen core 1, such that a weight sense is obtained during writing with the pen core 1. In addition, the elastic component also provides a certain elastic margin, which is capable of enabling an actual size of the passive electromagnetic pen in delivery to be equal to a standard size by the axial displacement. The elastic component may adopt a spring, a rubber rod (such as a silicone rod), and other elastic structures, or may be a composite structure composed of the spring and the rubber rod.

The pen core 1 of the present disclosure may be implemented by a pen core of an existing fountain pen.

Specifically, as shown in FIG. 1, FIG. 3, or FIG. 4, the pen body further includes a pen core rod 12, and the pen core rod 12 is located between the first iron core 2 and the pen core clamp link 3, and may protect the pen core 1. The pen core clamp link 3 is loaded from a direction of the pen tip of the iron core holder during assembling first. After the pen core clamp link 3 is loaded, the pen core rod 12 is combined with the front portion 61 of the iron core holder from the direction of the pen tip.

Referring to FIG. 1 and FIG. 3, further, as a preferred embodiment, a step 31 is disposed on the pen core clamp link 3.

According to the pen core clamp link 3 of the present disclosure, one end of the pen core clamp link clamps the pen core 1, and the other end of the pen core clamp link is an elongated plastic rod with a step difference. When the pen core 1 is stressed, the pen core clamp link 3 has a linking function, a tail end of the link is provided with one step 31, which is capable of passing through the center of the second iron core 4, and the third iron core 5 is pushed to move by the step 31.

Figure 7:
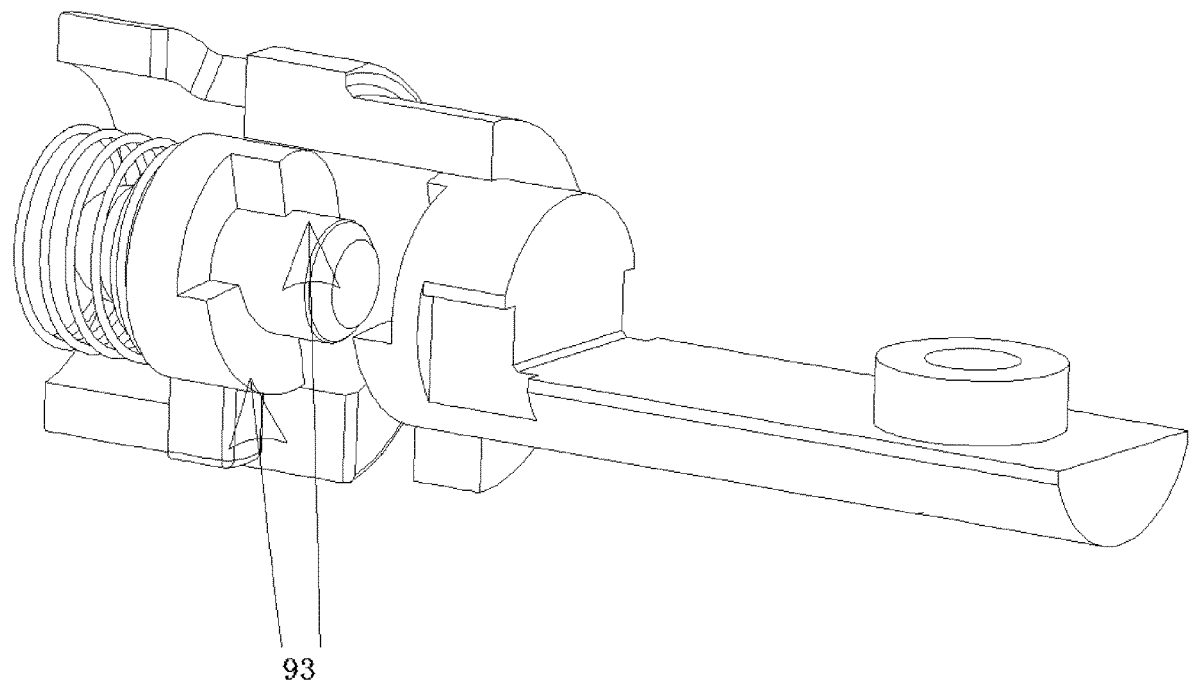
FIG. 7 is a sectional view of a pressure regulating plate of the present disclosure.
Figure 8:
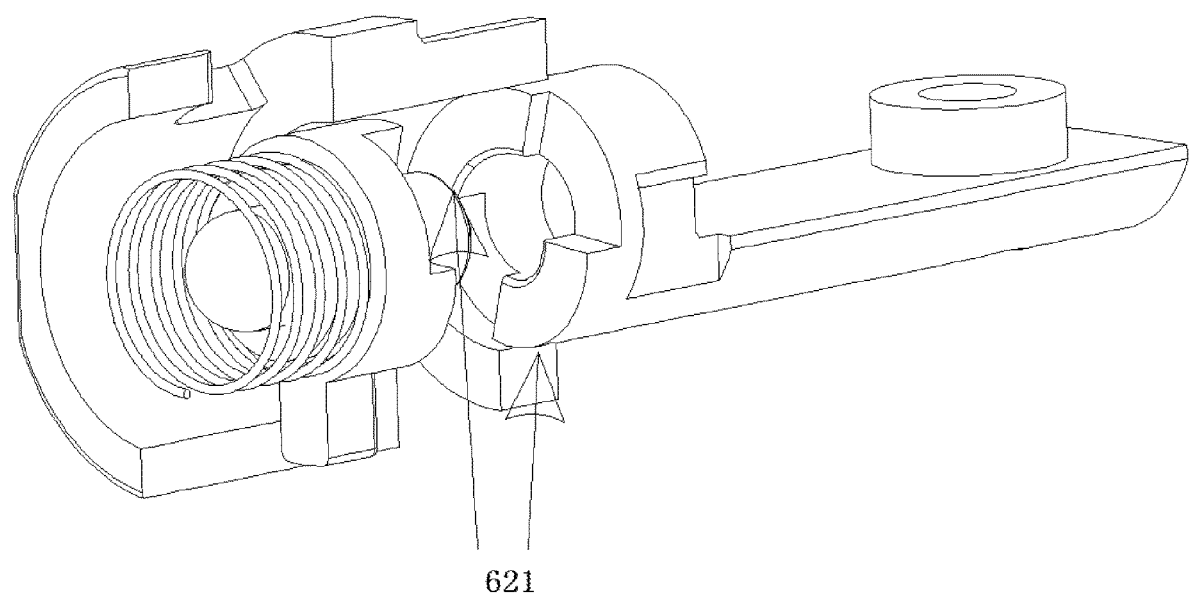
FIG. 8 is a sectional view of a first structure of the present disclosure.

Referring to FIG. 7, and FIG. 8, further, as a preferred embodiment, a contact surface between the pressure regulating plate 9 and the first structure 62 is a first inclined plane 93, and a contact surface between the first structure 62 and the pressure regulating plate 9 is a second inclined plane 621.

The first inclined plane 93 and the second inclined plane 621 are neither perpendicular to or parallel to an axial direction of the pen core of the electromagnetic fountain pen. An inclination angle and an inclination mode (such as left inclination, right inclination, and the like) of the first inclined plane 93 and the second inclined plane 621 may both be flexibly selected according to actual needs.

Contact surfaces between the pressure regulating plate 9 and the first structure 62 both adopt an inclined plane structure, such that since the pressure regulating plate 9 in rotation is in inclined surface contact with the first structure 62, the pressure regulating plate may rise or fall along the inclined plane, and then a space for accommodating the elastic component is changed, such that the elastic component moves in the axial direction, thereby changing the weight sense during writing with the pen.

Referring to FIG. 3, further, as a preferred embodiment, the elastic component includes a silicone rod 7 and a spring 8 sleeved outside the silicone rod 7, and the silicone rod 7 is fixedly connected with the pressure regulating plate 9.

The silicone rod 7 and the spring 8 of the present disclosure are used for providing a reverse acting force to the pen core 1, such that the weight sense is obtained during writing with the pen core 1. Specifically, a part of length of the silicone rod 7 may be fixed in the pressure regulating plate 9, and the spring 8 is sleeved outside the silicone rod 7. When the pen core 1 is stressed, the silicone rod 7 and the spring 8 may exert a force towards a tail portion (i.e., the first structure) 62 of the iron core holder to obtain a reverse acting force. Moreover, a contact surface between the silicone rod 7 or the spring 8 and the pressure regulating plate 9 may be a flat plane.

Figure 6:
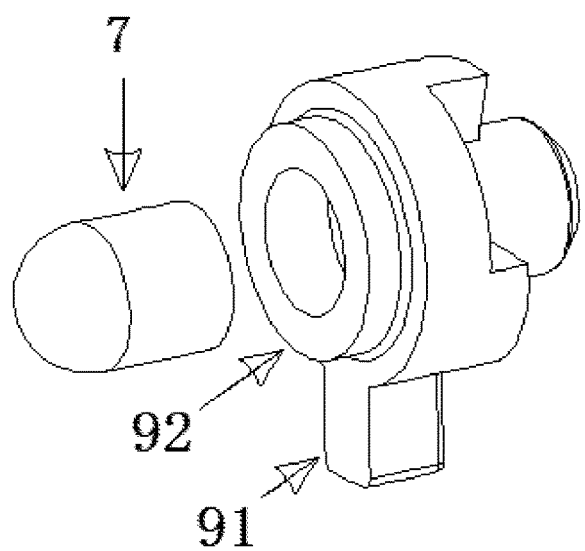
FIG. 6 is a schematic diagram of a matching structure of the pressure regulating plate and the rubber rod of the present disclosure.

Referring to FIG. 6, further, as a preferred embodiment, a hole 92 matched with the silicone rod 7 is disposed in the pressure regulating plate 9.

The hole 92 may be a blind hole of a cylindrical hole, an irregular hole, and other structures, and an inner diameter thereof is slightly larger than that of the silicone rod 7, such that the silicone rod 7 may be inserted into the hole to implement a fixing function.

Referring to FIG. 3 or FIG. 4, further, as a preferred embodiment, a rotary handle 91 is disposed on the pressure regulating plate 9.

In the present disclosure, the pressure regulating plate 9 may be rotated more conveniently by additionally providing the rotary handle 91. The rotary handle 91 may be partially exposed from an outer surface of the iron core holder.

Further, as a preferred embodiment, an outer diameter of the second iron core is smaller than that of the third iron core.

In the present disclosure, the outer diameter of the third iron core without the wound coil is larger than that of the second iron core with the wound coil. The outer diameter of the third iron core is reduced close to one end of the second iron core, such that an overall appearance of the pen may not be abrupt due to the third iron core without the wound coil in the interior, thereby having a better consistency in overall appearance.

Further, as a preferred embodiment, a first through hole is formed in the center of the second iron core, a second through hole is formed in a center of the third iron core, and a diameter of the first through hole is larger than that of the second through hole.

In the present disclosure, the diameter of the first through hole of the second iron core is larger than that of the second through hole of the third iron core, such that the pen core is capable of pushing the third iron core by the step at the tail end of the pen core clamp link.

Referring to FIG. 3 or FIG. 4, further, as a preferred embodiment, a PCBA circuit board 10 is disposed outside the iron core holder.

The PCBA circuit board 10 is electrically connected with the coil to convert the changed inductance into a change of the frequency, such that the antenna board is capable of obtaining different frequencies of the pen, and different pressure values of the pen are generated. Specifically, the PCBA circuit board 10 is located behind the iron core holder, and may be fixedly connected with the iron core holder by a screw 11 and other modes, as shown in FIG. 3 or FIG. 4.

As shown in FIG. 3 or FIG. 4, further, as a preferred embodiment, the PCBA circuit board 10 is connected with the iron core holder by the screw 11.

The operating principle of the passive electromagnetic fountain pen of the present disclosure is as follows: when the pen tip of the pen core is stressed during writing, the pen core passes through the center of the first iron core to be clamped by one end of the pen core clamp link, the other end (long rod) of the pen core clamp link passes through the center of the second iron core, and the third iron core is pushed to move by the step, such that different distances are formed between the second iron core and the third iron core, thereby changing an inductance value on the coil of the second iron core. The changed inductor of the second iron core and the inductor of the first iron core are connected in parallel with the fixed capacitor on the PCBA circuit board, such that a frequency emitted by the pen is changed, and different changes of a pressure value of the pen are generated. Meanwhile, movement of the third iron core in the axial direction may squeeze the elastic component composed of the silicone rod and the spring, which gives the pen core a reverse acting force, thereby having the weight sense during writing with the pen core. In addition, the pressure regulating plate and the first structure matched with the pressure regulating plate are additionally provided in the present disclosure, when the actual size of the passive electromagnetic fountain pen in delivery needs to be equal to the standard size or different weight senses need to be obtained, only the rotary handle of the pressure regulating plate needs to be rotated, such that a surface contact mode between the pressure regulating plate and the first structure is changed (such as rising or falling of the inclined plane contacted) to generate the axial displacement. The axial displacement of the pressure regulating plate may change the space for accommodating the silicone rod and the spring, such that the silicone rod and the spring also generate corresponding axial displacement (the actual size of the passive electromagnetic fountain pen is equal to the standard size or different weight senses are obtained).

The foregoing describes the preferred embodiments of the present disclosure in detail, but the present disclosure is not limited to the embodiments. Those skilled in the art may further make various equivalent modifications or substitutions without violating the spirit of the present disclosure, and these equivalent modifications or substitutions are all included in the scope defined by the claims of the present application

What is claimed is:

1. A passive electromagnetic fountain pen, comprising:
   a pen core; and
   a pen body,
   wherein the pen body comprises a first iron core and an iron core holder, a pen core clamp link, a second iron core, a third iron core, an elastic component, a pressure regulating plate, and a first structure matched with the pressure regulating plate are disposed sequentially from front to back in the iron core holder, coils are wound outside the first iron core and the second iron core, the first iron core is close to a pen tip of the pen core, the second iron core is fixedly connected with the iron core holder, the pen core is configured to pass through a center of the first iron core, and then be clamped by one end of the pen core clamp link, and the other end of the pen core clamp link is configured to pass through a center of the second iron core, and then drive the third iron core to move; and
   wherein the pressure regulating plate when in rotation is configured to be in surface contact with the first structure to generate an axial displacement to change an axial displacement of the elastic component;
   wherein a step is disposed on the pen core clamp link.

2. The passive electromagnetic fountain pen of claim 1, wherein a contact surface of the pressure regulating plate includes a first incline plane that is in contact with the first structure, and a contact surface of the first structure includes a second inclined plane that is in contact with the pressure regulating plate.

3. The passive electromagnetic fountain pen of claim 2, wherein a rotary handle is disposed on the pressure regulating plate.

4. The passive electromagnetic fountain pen of claim 2, wherein an outer diameter of the second iron core is smaller than an outer diameter of the third iron core.

5. The passive electromagnetic fountain pen of claim 2, wherein a first through hole is formed in the center of the second iron core, a second through hole is formed in a center of the third iron core, and a diameter of the first through hole is larger than a diameter of the second through hole.

6. The passive electromagnetic fountain pen of claim 2, wherein a printed circuit board assembly (PCBA) circuit board is disposed outside the iron core holder.

7. The passive electromagnetic fountain pen of claim 1, wherein the elastic component comprises a silicone rod and a spring sleeved outside the silicone rod, and the silicone rod is fixedly connected with the pressure regulating plate.

8. The passive electromagnetic fountain pen of claim 7, wherein a hole matched with the silicone rod is disposed in the pressure regulating plate.

9. The passive electromagnetic fountain pen of claim 7, wherein a rotary handle is disposed on the pressure regulating plate.

10. The passive electromagnetic fountain pen of claim 7, wherein an outer diameter of the second iron core is smaller than an outer diameter of the third iron core.

11. The passive electromagnetic fountain pen of claim 7, wherein a first through hole is formed in the center of the second iron core, a second through hole is formed in a center of the third iron core, and a diameter of the first through hole is larger than a diameter of the second through hole.

12. The passive electromagnetic fountain pen of claim 1, wherein a rotary handle is disposed on the pressure regulating plate.

13. The passive electromagnetic fountain pen of claim 1, wherein an outer diameter of the second iron core is smaller than an outer diameter of the third iron core.

14. The passive electromagnetic fountain pen of claim 1, wherein a first through hole is formed in the center of the second iron core, a second through hole is formed in a center of the third iron core, and a diameter of the first through hole is larger than a diameter of the second through hole.

15. The passive electromagnetic fountain pen of claim 1, wherein a printed circuit board assembly (PCBA) circuit board is disposed outside the iron core holder.

16. The passive electromagnetic fountain pen of claim 15, wherein the PCBA circuit board is connected with the first structure by a screw.

* * * * *